United States Patent [19]

Sato

[11] 4,096,503
[45] Jun. 20, 1978

[54] SAFETY DEVICE FOR THE ELECTRIC SHUTTER OF A CAMERA

[75] Inventor: Akihiko Sato, Tokyo, Japan

[73] Assignee: Nippon Kogaku K.K., Tokyo, Japan

[21] Appl. No.: 696,492

[22] Filed: Jun. 16, 1976

[30] Foreign Application Priority Data

Jun. 21, 1975   Japan ................................ 50-75066

[51] Int. Cl.² ......................... G03B 9/00; G03B 17/38
[52] U.S. Cl. .................................. 354/234; 354/242; 354/268
[58] Field of Search ............... 354/226, 234, 235, 237, 354/238, 242, 258, 267, 268

[56] References Cited

U.S. PATENT DOCUMENTS

| | | | |
|---|---|---|---|
| 3,768,390 | 10/1973 | Kobori | 354/235 X |
| 3,906,532 | 9/1975 | Kuramoto et al. | 354/258 |
| 3,922,693 | 11/1975 | Matsui | 354/234 X |
| 3,930,263 | 12/1975 | Urano | 354/268 |
| 3,955,209 | 5/1976 | Akiyama | 354/234 |

*Primary Examiner*—L. T. Hix
*Assistant Examiner*—William B. Perkey
*Attorney, Agent, or Firm*—Fitzpatrick, Cella, Harper & Scinto

[57] ABSTRACT

In the electric shutter of a camera having a forward curtain restraining member for restraining a forward shutter curtain in charged condition, a rearward curtain restraining member for restraining a rearward shutter curtain in charged condition with the aid of the attraction of a magnet, and an anticipatory actuation member starting to move prior to the movement of the forward shutter curtain, a safety device is provided with forward curtain control means which is displaceable to a position to release the forward shutter curtain from restraint by utilizing movement of the anticipatory actuation member and which, when the magnet is unattracted, is displaceable to a position to render the forward shutter curtain unreleasable from restraint by utilizing movement of the rearward curtain restraining member.

9 Claims, 9 Drawing Figures

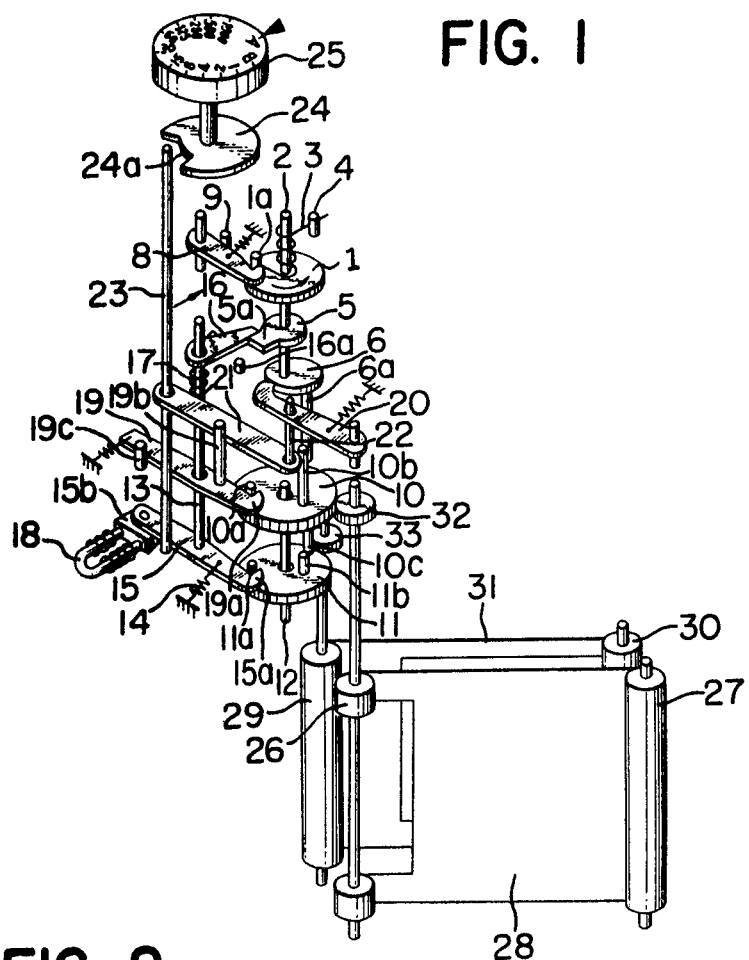
FIG. 1
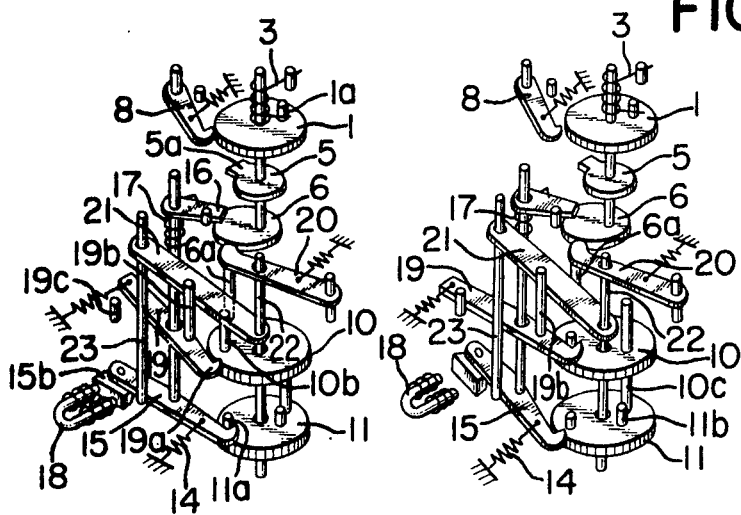
FIG. 2
FIG. 3

SAFETY DEVICE FOR THE ELECTRIC SHUTTER OF A CAMERA

BACKGROUND OF THE INVENTION

1. Field of the Invention

This invention relates to a safety device for an electric shutter in a camera having a focal plane shutter which renders shutter release impossible when the power supply battery in the camera has been consumed.

2. Description of the Prior Art

In the electric shutter, when the battery has been consumed, the rearward curtain of the focal plane shutter is no longer subjected to restraint and the shutter moves without forming the slit, thus failing to provide a desired shutter speed.

It is therefore required that when the power supply battery has been consumed, the shutter be prevented from being actuated even if one tries to effect shutter release.

For this purpose, it has been known to utilize a forward curtain restraining member for restraining the forward shutter curtain in charged condition or an anticipatory actuation member starting to move prior to movement of the forward shutter curtain and to effect engagement of such member only when the battery has been consumed, thereby inhibiting such restraint from being released. However, the technique utilizing such a relation of engagement has suffered from shocks of engagement resulting from a rapidly moving body being abruptly restrained, and has been disadvantageous in respect of durability of various parts as a result of such shocks.

Further, once the anticipatory actuation member is restrained in the course of its movement, it can no longer expect much of an inertia force when its movement is again started to release the forward curtain restraining member and thus, it is necessary, in advance, to increase the releasing force of the anticipatory actuation member, which in turn requires an increased winding force and may result in reduced durability of such member. Moreover, in the electric shutter, it takes some time for the magnet to be energized and this leads to the necessity of compensating for the time delay, which also makes it necessary to adopt a signal from a switch operatively associated with the movement of the anticipatory actuation member. This also requires the releasing force of the anticipatory actuation member to be increased and thus, this member must be heavier in weight in order that it may remain operative for a predetermined time, which would in turn lead to larger sizes of the parts.

It is also known to use a further magnet, in addition to the rearward curtain restraining magnet, to inhibit shutter release, but this has been disadvantageous in that the service life of the battery is shortened.

SUMMARY OF THE INVENTION

It is an object of the present invention to eliminate all the above-noted disadvantages and to provide a safety device for the electric shutter of a camera which inhibits shutter release when the battery has been consumed, without abruptly restraining the rapidly moving body and without using a magnet intended exclusively for such purpose.

According to the present invention, the safety device is provided with forward curtain control means which is displaceable to a position to release a forward shutter curtain from restraint by utilizing movement of an anticipatory actuation member adapted to start to move prior to movement of the forward shutter curtain to move a forward curtain restraining member for restraining the forward shutter curtain in charged condition and which is displaceable to a position to render the forward shutter curtain unreleasable from restraint by utilizing movement of a rearward curtain restraining member for restraining a rearward shutter curtain in charged condition with the aid of attraction of a magnet. When the battery is normal, the forward curtain control means may be displaced by movement of the anticipatory actuation member to move the forward curtain restraining member and thereby release the forward shutter curtain from restraint. When the battery has been consumed, movement of the rearward curtain restraining member already released from the magnet takes place prior to movement of the forward shutter curtain and by such movement of the rearward curtain restraining member, the forward curtain control means may be displaced to render the forward shutter curtain unreleasable from the restraint imparted by the forward curtain restraining member.

Other objects and features of the present invention will become fully apparent from the following detailed description taken in conjunction with the accompanying drawings.

BRIEF DESCRIPTION OF THE DRAWINGS

FIGS. 1 to 3 are perspective views of the shutter device for illustrating a first embodiment of the present invention.

DESCRIPTION OF THE PREFERRED EMBODIMENTS

Figure 4:
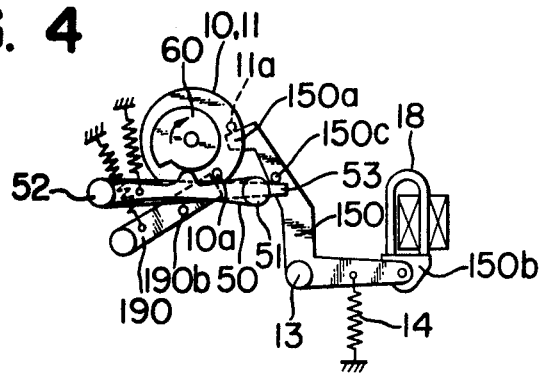
FIGS. 4 to 6 are plan views of a second embodiment of the present invention and illustrating the operating conditions of the essential portions thereof.

Referring to FIGS. 1 to 3, there is shown a first embodiment of the present invention. In FIG. 1 which shows the position at the end of shutter charge for automatic exposure photography, a pin 1a is studded in a gear 1 operatively associated with an unshown film advance lever and the gear 1 is supported on a shaft 2 rotatably supported on a camera body (not shown). A spring 3 is coiled on the shaft 2 and has one end secured to the pin 1a and the other end secured to a spring hook pin 4 secured to the camera body, so as to impart a counter-clockwise bias to the gear 1. Further secured on the shaft 2 are a rotatable plate 5 having a projection 5a and a disc cam 6 having a connector pin 6a on the underside thereof. The rotatable plate 5 and the disc cam 6, in combination with the gear 1 constitute an anticipatory actuation member.

A hooked lever 8, biased counter-clockwise, is engageable with the pin 1a on the gear 1 and limited in degree of rotation by a pin 9.

A forward curtain gear 10 and a rearward curtain gear 11 are rotatably supported on a shaft 12. A forward curtain restraining pin 10a and a first connector pin 10b engageable with the connector pin 6a of the disc cam 6 are studded in the upper surface of the forward curtain gear 10, and a second connector pin 10c is studded in the underside of the forward curtain gear 10. Also, a rearward curtain restraining pin 11a and a connector pin 11b engageable with the second connector pin 10c are studded in the upper surface of the rearward curtain gear 11.

Secured to a restraining shaft 13 rotatably supported on the camera body is a rearward restraining lever 15 biased clockwise, and a charge lever 16 engageable with the projection 5a of the rotatable plate 5 is rotatably supported on the restraining shaft 13, the rotation of the charge lever 16 being limited by a pin 16a. One end of the rearward curtain restraining lever 15 is formed with a pawl 15a for engagement with the rearward curtain restraining pin 11a, and the other end of the lever 15 is provided with an armature 15b which is attractable by the rearward curtain restraining magnet 18 in an electric shutter circuit. On the other hand, a charge spring 17 supported at one end by the restraining shaft 13 is suspended from the charge lever 16 to impart a clockwise biasing force thereto to thereby urge the rearward curtain restraining lever 15 against the magnet 18.

The biasing force of the charge spring 17 is greater than that of the spring 14.

A forward curtain restraining lever 19 biased counterclockwise about the restraining shaft 13 has one end formed into a pawl 19a for engagement with the forward curtain restraining pin 10a and has an engagement releasing pin 19b on the upper surface thereof. The rotation of the lever 19 is limited by a pin 19c. A follower lever 20 biased clockwise is the follower of the disc cam 6 and, at the end of shutter charge, it occupies a position of the least displacement, namely, a position in which its engaging portion is closest to the rotatable shaft of the disc cam 6. An engagement releasing lever 21, which is in engagement with the engagement releasing pin 19b, has one end rotatably supported on a connector shaft 22 having the follower lever 20 loosely mounted thereon; and has the other end also rotatably supported on an interlocking bar 23. The interlocking bar 23 is in a position where it is biased in the direction of arrow by the engagement releasing pin 19b and by the connector shaft 22 so that the lower end of the bar 23 is engaged with the rearward curtain restraining lever 15 while the upper end is engageable with a cam 24 having a cutaway portion 24a. The elements 20-23 together constitute forward curtain control means.

The cam 24 is coaxial with a conventional shutter dial 25 bearing indication of AUTO (mark A) and mechanical shutter speeds from 1/1000 to 1 second and B (bulb), and the cutaway portion 24a faces the interlocking bar 23 when the dial 25 is set to the AUTO indication or when the shutter time is an electrically controlled shutter speed.

The focal plane shutter is formed by a forward curtain 28 stretched between a forward curtain pulley 26 and a forward curtain driving drum 27 and a rearward curtain 31 stretched between a rearward curtain drum 29 and a rearward curtain driving pulley 30. The shaft of the forward curtain pulley 26 supports thereon a forward curtain pinion 32 which is in meshing engagement with the forward curtain gear 10, and the shaft of the rearward curtain pulley 29 supports thereon a rearward curtain pinion 33 which is in meshing engagement with the rearward curtain gear 11.

Operation of the present embodiment will now be described.

(i) When the power supply battery is full (battery normal):

The armature 15b of the rearward curtain restraining lever is being urged toward the magnet 18 by the biasing force of the charge spring 17 and if the switch in the unshown electric circuit is closed, the magnet 18 will be energized to attract the armature 15b. When shutter release operation is effected in a known manner, the hooked lever 8 is rotated clockwise out of engagement with the pin 1a, so that the gear 1, with the rotatable plate 5 and the disc cam 6, begins to be rotated in the direction of arrow in FIG. 1 by the spring 3. As the rotation progresses, the follower lever 20 is rotated counter-clockwise by the disc cam 6, thus increasing its amount of displacement, while the engagement releasing lever 21 is rotated about the interlocking bar 23 by the connector shaft 22 following the lever 20, thus increasing its amount of rotation, and at the end of the rotation of the anticipatory actuation member 1, 5, 6, the engagement releasing lever 21 engages the engagement releasing pin 19b on the forward curtain restraining lever 19 to thereby rotate the restraining lever 19 clockwise, thus retracting the pawl 19a from the forward curtain restraining pin 10a of the forward curtain gear. Accordingly, the forward curtain 28 is moved by the drive of the forward curtain driving drum 27 to open the shutter. In the first half of the rotation of the anticipatory actuation member, the biasing force of the charge spring 17 is added to the rotative force of the actuation member through the charge lever 16 and the rotatable plate 5.

Subsequently, when the current to the magnet 18 is cut off in a known manner to obtain a shutter speed which will provide proper exposure, rearward curtain restraining lever 15 is rotated clockwise by the biasing force of the spring 14, so that the lever 15 is released out of engagement with the rearward curtain restraining pin 11a.

Thus, by the drive of the rearward curtain driving pulley (30 in FIG. 1), the rearward curtain (31 in FIG. 1) is moved to close the shutter.

Also, in response to the rotation of the rearward curtain restraining lever 15, the interlocking bar 23 is moved in the direction of arrow in FIG. 1 to cause its upper end to enter the cutaway portion (24a in FIG. 1).

Shutter charge is accomplished by means of a film advance lever, not shown. The anticipatory actuation member 1, 5, 6 is rotated clockwise from its position of FIG. 2 in a known manner. When this occurs, the biasing force of the spring 3 is increased to thereby cause the projection 5a of the rotatable plate 5 to increase the biasing force of the charge spring 17 so that the armature 15b of the rearward curtain restraining lever 15 is urged against the magnet 18 while, at the same time, the upper end of the interlocking bar 23 is forced out of the cutaway portion 24a of the change-over cam 24 onto the outer periphery of the cam 24 by the rotation of the rearward curtain restraining lever 15. The follower lever 20 reduces its amount of displacement and when in the same condition as at the time of shutter charge, it comes into engagement with the disc 6. Further, the connector pin 6a of the disc cam causes clockwise rotation of the forward curtain gear 10 and the rearward curtain gear 11, so that these gears are respectively restrained by the forward curtain restraining lever 19 and the rearward curtain restraining lever 15, whereupon the position of FIG. 1 is restored.

(ii) When the power supply battery has been consumed (battery consumed):

Shutter release is effected in the position of FIG. 1. The hooked lever 8 is disengaged from the gear 1 to permit rotation of the anticipatory actuation member 1, 5, 6. The rotation of the rotatable plate 5 releases the biasing force of the charge spring 17 which has so far urged the rearward curtain restraining lever 15 against the magnet 18, and since the magnet 18 is not energized then, the rearward curtain restraining lever 15 is rotated clockwise by the biasing force of the spring 14 to thereby permit the interlocking bar 23 to move in the direction of arrow.

Also, rotation of the disc cam 6 causes gradual counter-clockwise displacement of the follower lever 20 which in turn causes leftward and downward movement of the connector shaft 22, as viewed in the drawings. The engagement releasing lever 21 is rotated clockwise with the vicinity of the engagement releasing pin 19b as the center of rotation, so that the interlocking bar 23 is moved in the direction of arrow to bring the upper end thereof into the cutaway portion 24a of the change-over cam.

Thus, the forward curtain gear 10 is not released from restraint and the forward curtain is not permitted to move. The rearward curtain gear 11 is released from restraint as shown in FIG. 3, but this gear is neither permitted to move because of the engagement between the second connector pin 10c of the forward curtain gear and the connector pin 11b of the rearward curtain gear. Thus, the shutter is not operative and no film exposure occurs. Such condition is shown in FIG. 3.

Shutter charge is then effected.

As in the case (i) where the battery was normal, clockwise rotation of the anticipatory member 1, 5, 6 again brings about the position of FIG. 1. However, the forward and rearward curtain gears 10 and 11 and the forward curtain restraining lever 19 are not moved from the charged condition of FIG. 3. If an operation for multi-exposure (photography) is added during the shutter charge, it will be possible to bring about the completed shutter charge condition (FIG. 1) and waste of the film may be avoided.

When a spare battery is available, the battery used may be replaced by the spare one to carry out photography continuedly. When no spare battery is available, the setting of the shutter dial 25 may be changed from AUTO (mark A) to an appropriate mechanical shutter speed, whereafter photography may take place.

When the setting of the shutter dial 25 has been changed to a mechanical shutter speed, the interlocking bar 23 is restricted in movement by some other portion of the change-over cam than the cutaway portion 24a, so that the bar 23 becomes independent of the action of the rearward curtain restraining lever 15 to permit the restraint and release of the rearward curtain to be accomplished by a known mechanism, thereby providing the shutter time as indicated by the shutter dial.

During the inoperative shutter condition of FIG. 3, if the setting of the shutter dial (25 in FIG. 1) is changed to a mechanical shutter speed, the interlocking bar 23 will be moved leftwardly and downwardly, as viewed in the drawing, so that the engagement releasing lever 21 will be rotated about the connector shaft 22 and into engagement with the engagement releasing pin 19b to thereby release the forward curtain gear 10 from restraint, whereby the forward and the rearward curtain may start at the same time to prevent occurrence of film exposure. The shutter charge in this case may be substantially identical to that in the case (i) without any inconvenience encountered.

Figure 5:
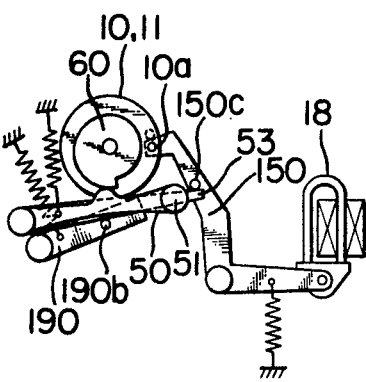
Figure 6:
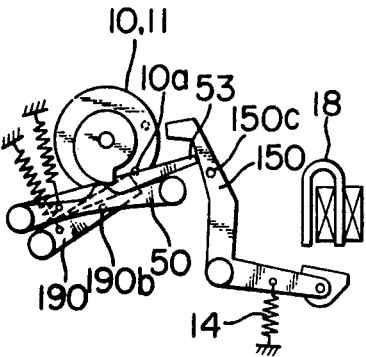

Reference will now be had to FIGS. 4 to 6 to describe a second embodiment of the present invention. In this embodiment, those parts not shown are common to the first embodiment and identical reference characters designate identical elements in the first embodiment. Now, in FIG. 4 which shows the position at the end of the shutter charge for automatic exposure photography, a cam 60 identical to the disc cam 6 in the first embodiment and the forward and rearward curtain gears 10 and 11 are biased clockwise, conversely to the first embodiment. A follower lever 50 biased clockwise about a fixed shaft 51 is the follower of a cam 60. An engagement releasing lever 53 is rotatably supported on that end 52 of the follower lever 50 which is opposite from the fixed shaft 51, and it is engageable with an engagement releasing pin 190b on a forward curtain restraining lever 190 and with a pin 150c on a rearward curtain restraining lever 150 so as to utilize these pins as lever pivots.

The above-described elements 50-53 together constitute forward curtain control means.

Operation of the second embodiment will now be described.

(i) When the power supply battery is full (battery normal):

In the position of FIG. 4, shutter release is effected. The cam 60 is rotated clockwise to thereby displace the follower lever 50 counter-clockwise about the fixed shaft 51. Since the rearward curtain restraining lever 150 has been attracted to the magnet 18, the engagement releasing lever 53 is rotated counter-clockwise with the pin 150c on the lever 53 as a pivot, namely, with the vicinity of the pin 150c as the center of rotation. Thus, the engagement releasing pin 190b on the forward curtain restraining lever is forced downwardly, as viewed in the drawing, thereby releasing the engagement between the forward curtain restraining lever 190 and the forward curtain restraining pin 10a on the forward curtain gear. FIG. 5 shows the position in which the forward curtain has been released.

(ii) When the power supply battery has been consumed (battery consumed):

At such time, the rearward curtain restraining lever 150 is not attracted to the magnet 18, so that this lever is rotated clockwise by the spring 14 to thereby retract the pin 150c on this lever from the lever 53 in the manner as shown in FIG. 6.

As a result, the engagement releasing lever 53 is rotated counter-clockwise with the engagement releasing pin 190b on the forward curtain restraining lever as a lever pivot, namely, with the vicinity of the pin 190b as the center of rotation. Thus, the engagement between the forward curtain restraining lever 190 and the forward curtain restraining pin 10a on the forward curtain gear cannot be released.

Figure 8:
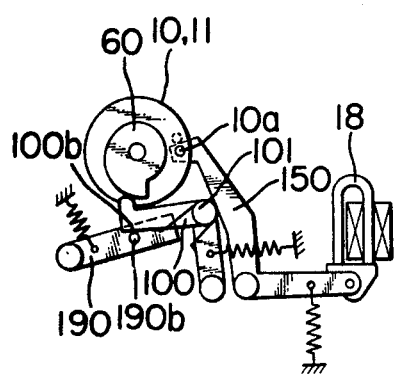
Figure 9:
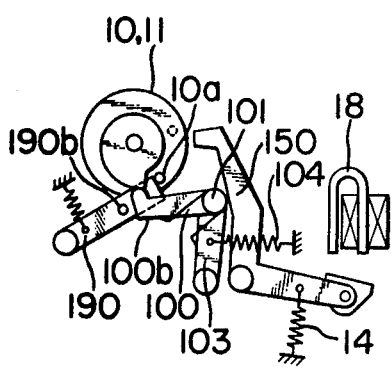

A third embodiment of the present invention will now be described by reference to FIGS. 7 to 9. In this embodiment, those parts not shown are common to the first and second embodiments and identical reference characters designate identical elements in the two previous embodiments.

In this embodiment, the functions of the follower lever and the engagement releasing lever in the first and the second embodiment are performed by a single member which is a forward curtain control lever 100.

Figure 7:
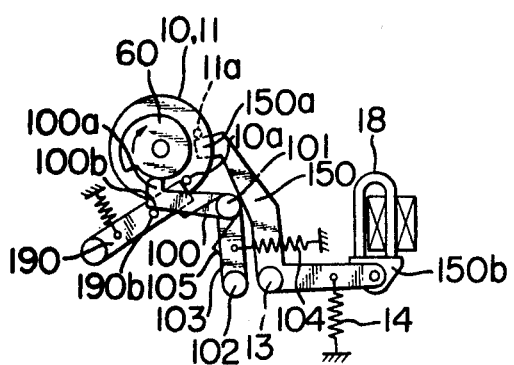
FIGS. 7 to 9 are plan views of a third embodiment of the present invention and illustrating the operating conditions of the essential portions thereof.

In FIG. 7 which shows the position at the end of the shutter charge for automatic photography, the forward curtain control lever 100 is rotatably supported on a movable shaft 101 and the projection 100a of the control lever 100 is in engagement with the camming surface of the cam 60 while the side edge 100b of the control lever 100 is in engagement with the engagement releasing pin 190b on the forward curtain restraining lever. A lever 103, having one end supported by the movable shaft 101 and the other end supported by a fixed shaft 102, is biased clockwise by a bias spring 104 to normally urge the movable shaft 101 against the rearward curtain restraining lever 150. A spring 105 is extended between the lever 103 and the forward curtain control lever 100 to normally urge the latter lever 100 against the cam 60.

The above-described elements 100-105 together constitute forward curtain control means.

Operation of the present invention will now be described.

(i) When the power supply battery is full (battery normal):

In the position of FIG. 7, shutter release is effected. Since the rearward curtain restraining lever 150 has been attracted to the magnet 18, the movable shaft 101 is now immovable and the follower lever or the forward curtain control lever 100 is displaced only counterclockwise about the movable shaft 101 by the clockwise rotation of the cam 60.

Thus, the side edge 100b of the follower lever 100 forces down the engagement releasing pin 190b on the forward curtain restraining lever to thereby release the engagement between the forward curtain restraining lever 190 and the forward curtain restraining pin 10a on the forward curtain gear. FIG. 8 illustrates the position in which the forward curtain has been released.

(ii) When the power supply battery has been consumed (battery consumed):

At such time, the rearward curtain restraining lever 150 is not attracted to the magnet 18, so that the lever 150 is rotated clockwise by the spring 14 and the lever 103 is also rotated clockwise by the biasing spring 104 with the movable shaft 101 urged against the rearward curtain restraining lever 150. With such rotation, the follower lever 100 is moved rightwardly, as viewed in the drawing, and retracted to a position in which the side edge 100b of the lever 100 is not engageable with the engagement releasing pin 190b of the forward curtain restraining lever. Accordingly, the forward shutter curtain is not released from restraint even if the cam 60 is rotated until its movement is completed.

In the present embodiment, the lever 103 serves as a lever to which the biasing lever 104 and spring 105 are secured, and biasing forces corresponding to those of the springs 104 and 105 may directly be imparted to the follower lever 100 and the movable shaft 101.

Further, the object of the present invention may also be acheived by replacing the anticipatory actuation member with a member which assumes its charged condition during shutter charge and is operated prior to the operation of the forward shutter curtain driving shutter release, for example, a quick return mirror operating mechanism, and it will be appreciated that the invention is not limited to the present embodiments.

According to the present invention, as has been described hitherto, it is possible to inhibit shutter release during the time the battery is consumed without resorting to the engagement with the forward curtain restraining member of the anticipatory actuation member. This eliminates the necessity of abruptly restraining the rapidly moving body and accordingly, eliminates any shock which would otherwise occur due to the engagement, thus increasing the durability of the parts and the reliability of operation.

Also, any mechanism for releasing the engagement is unnecessary and shutter charge may be accomplished without any extra operation being required.

Further, there is no fear of increased camera size which would accompany the increased winding force or the increased weight as would be experienced when the anticipatory actuation member is restrained.

Furthermore, battery consumption is slower than in the device of the type which employs a magnet for exclusive use with the release button.

I claim:

1. A safety device in a camera's focal plane shutter device which comprises shutter moving means (10, 11, 32, 33) having a forward curtain interlocking portion interlocked with a forward shutter curtain biased in the direction of movement predetermined for shutter release and a rearward curtain interlocking portion interlocked with a rearward shutter curtain biased in the same direction as said forward curtain and said shutter curtains being simultaneously chargeable and separately releasable, forward curtain restraining means (19, 190) disposed for displacement between a first position to restrain said forward curtain interlocking portion and a second position to release said restraint, rearward curtain restraining means (13 - 17, 150) disposed for displacement between a first position to restrain said rearward curtain interlocking portion and a second position to release said restraint, rearward curtain control means (18) for restraining said rearward curtain restraining means in said first position thereof until a predetermined time for providing proper exposure elapses from the start of shutter release operation, and anticipatory actuation means (1 - 6) disposed engageably with said rearward curtain restraining means, said anticipatory actuation means displacing said rearward curtain restraining means to its first position in response to shutter charge operation, and rendering said rearward curtain restraining means displaceable to its second position in response to shutter release operation; and forward curtain control means disposed between said anticipatory actuation means and said forward curtain restraining means engageably with both of them and with said rearward curtain restraining means, said forward curtain control means being effective during shutter charge operation to displace said forward curtain restraining means to said first position in coordination with said anticipatory actuation means, said forward curtain control means, when said rearward curtain restraining means is restrained in the first position by said rearward curtain control means, being effective to transmit the movement of said anticipatory actuation means to said forward curtain restraining means during shutter release operation to thereby displace the forward curtain restraining means to said second position, and when said rearward curtain restraining means is in said second position, to render impossible said transmission.

2. A safety device according to claim 1, wherein said anticipatory actuation means operates while accumulating positional energy therein in response to a camera film advance operation during shutter charge and operates by discharging said positional energy during shutter release.

3. A safety device according to claim 2, wherein said anticipatory actuation means actuates said shutter moving means during shutter charge, thereby effecting the shutter curtain charge.

4. A safety device according to claim 3, wherein said forward curtain control means includes:
   a control member (100) disposed between and engageable with said anticipatory actuation means and said forward curtain restraining means; and
   means (101 – 105) for retracting said control member from the position between said anticipatory actuation means and said forward curtain restraining means when said rearward curtain restraining means is in its second position.

5. A safety device according to claim 3, wherein said forward curtain control means includes:
   a control member (20 – 23, 50 – 52) having a portion for engagement with said anticipatory actuation means and a portion for engagement with said forward curtain restraining means, said control member being effective, when said rearward curtain restraining means is in its first position, to transmit the movement of said anticipatory actuation means to said forward curtain restraining means and when said rearward curtain restraining means is in its second position, to vary the distance between said two engagement portions to thereby render said transmission impossible.

6. A safety device according to claim 4, wherein said anticipatory actuation means includes:
   a rotatable actuating member (1, 2, 5, 6); and
   biasing means (3) for biasing said actuating member in the direction of rotation predetermined for shutter release.

7. A safety device according to claim 6, wherein said rearward curtain control means includes an electromagnet for attracting and holding said rearward curtain restraining means.

8. A safety device according to claim 6, wherein said actuating member includes:
   a first engagement portion (6a) engageable with said shutter moving means during rotation of said actuating member;
   a second engagement portion (5a) engageable with said rearward curtain restraining means; and
   a rotatable cam (6, 60) for actuating said control member of said forward curtain control means.

9. A safety device according to claim 6, wherein said rearward curtain restraining means is displaceable to its first position while accumulating positional energy therein in response to rotation of said actuating member during shutter charge, and displaceable to its second position by discharging said positional energy after released from engagement by said rearward curtain control means.

* * * * *